(12) United States Patent
Wang et al.

(10) Patent No.: US 10,216,025 B2
(45) Date of Patent: Feb. 26, 2019

(54) CAPACITIVE TOUCH SCREEN AND BENDING JUDGMENT METHOD THEREFOR, AND DISPLAY DEVICE

(71) Applicant: BOE TECHNOLOGY GROUP CO., LTD., Beijing (CN)

(72) Inventors: Mingxi Wang, Beijing (CN); Shiming Shi, Beijing (CN); Xue Mao, Beijing (CN); Pao Ming Tsai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/679,070

(22) Filed: Aug. 16, 2017

(65) Prior Publication Data

US 2018/0120615 A1  May 3, 2018

(30) Foreign Application Priority Data

Oct. 28, 2016 (CN) .......................... 2016 1 0974105

(51) Int. Cl.
*G06F 3/044* (2006.01)
*G02F 1/1333* (2006.01)
*G02F 1/1343* (2006.01)
*G06F 3/041* (2006.01)

(52) U.S. Cl.
CPC ........ *G02F 1/13338* (2013.01); *G02F 1/1343* (2013.01); *G06F 3/044* (2013.01); *G06F 3/0416* (2013.01); *G06F 2203/04102* (2013.01)

(58) Field of Classification Search
CPC ........... G06F 3/044; G06F 2203/04107; G06F 2203/04111; G06F 2203/04112; G06F 1/1652; G06F 2203/04102
See application file for complete search history.

(56) References Cited

U.S. PATENT DOCUMENTS

2017/0147117 A1* 5/2017 Song .................... G06F 3/0412
2017/0285856 A1* 10/2017 Chang ................... G06F 1/1615
2018/0059822 A1* 3/2018 Seo ....................... G06F 3/0414

FOREIGN PATENT DOCUMENTS

| CN | 202486763 U | 10/2012 |
| CN | 202535639 U | 11/2012 |
| CN | 102968234 A | 3/2013 |
| CN | 103294287 A | 9/2013 |

* cited by examiner

*Primary Examiner* — Sanghyuk Park
(74) *Attorney, Agent, or Firm* — Kinney & Lange, P.A.

(57) ABSTRACT

The present disclosure provides a capacitive touch screen and a bending judgment method therefor, and a display device. The touch screen includes: a substrate; touch sensing electrodes and touch drive electrodes located on the substrate; and a touch chip electrically connected with the touch sensing electrodes and touch drive electrodes, and configured to apply a driving signal to the touch drive electrodes, detect a capacitance value of each touch sensing electrode, and when the capacitance values of a part of the touch sensing electrodes adjacent to each other, the number of which is equal to or greater than a preset number, are changed, and a difference in capacitance value between the touch sensing electrodes with changed capacitance values is less than a predetermined value, to determine a bending state of the touch screen based on capacitance value change information of the touch sensing electrodes with changed capacitance values.

20 Claims, 8 Drawing Sheets

CAPACITIVE TOUCH SCREEN AND BENDING JUDGMENT METHOD THEREFOR, AND DISPLAY DEVICE

CROSS-REFERENCE TO RELATED APPLICATION

This application claims the benefit of the Chinese Patent Application No. 201610974105.6 filed on Oct. 28, 2016 in the State Intellectual Property Office of China, the whole disclosure of which is incorporated herein by reference.

TECHNICAL FIELD

Embodiments of the disclosure generally relate to field of display technique, and in particular to a capacitive touch screen and a bending judgment method therefor, and a display device.

DESCRIPTION OF THE RELATED ART

A touch screen is an input device significantly improving a man-machine interface and includes advantages such as intuitive, simple, fast and the like. The touch screen has been widely used in many electronic products such as mobile phones, PAD, multimedia, public information query systems and the like. The touch screen is mainly classified to include a resistive touch screen, a capacitive touch screen, an infrared touch screen and a surface acoustic wave touch screen. The capacitive touch screen has been become the mainstream of the market due to its lack of mechanical movement wear defect in the screen, simple structure, high light transmittance, good linearity, dust, fire and scratch proof performance, stable performance even if in the harshest environment, and the like. Moreover, a notable advantage of the capacitive touch screen is a multi-touch function, thereby greatly improving operating characteristics and utilization of the electronic products.

Since the capacitive touch screen has many advantages described above, most of the current flexible touch displays utilizes the capacitive touch screen. At present, a command input function is realized by bending the screen so as to achieve new experience of the man-machine interface. However, it is necessary for the existing touch screen to be additionally provided with a sensing element to determine a bending state of the screen, which may affect cost and reliability of the product.

SUMMARY

The disclosure is made to overcome at least one of the above and other issues and defects existing in the prior arts.

In one aspect of the disclosure, an embodiment provides a capacitive touch screen comprising: a substrate; a plurality of touch sensing electrodes and a plurality of touch drive electrodes located on the substrate; and a touch chip electrically connected with the touch sensing electrodes and the touch drive electrodes respectively, the touch chip is configured to apply a driving signal to the touch drive electrodes and detect a capacitance value of each of the touch sensing electrodes, and further configured to, when the capacitance values of a part of the touch sensing electrodes, which are adjacent to each other and the number of which is equal to or greater than a preset number, are changed, and a difference in capacitance value of the part of the touch sensing electrodes, of which the capacitance values have been changed, is less than a predetermined value, determine a bending state of the capacitive touch screen based on capacitance value change information of the part of the touch sensing electrodes, of which the capacitance values have been changed.

In an exemplary embodiment of the disclosure, the touch sensing electrodes are disposed in the same layer as the touch drive electrodes; and each touch sensing electrode is composed of a plurality of grid-like sub-electrodes arranged in one of a row direction and a column direction, and each touch drive electrodes is composed of a plurality of grid-like sub-electrodes arranged in the other of the row direction and the column direction.

In an exemplary embodiment of the disclosure, at least one side of each of at least several grids of the grid-like sub-electrode is composed of a plurality of conductive strips extending in directions which are not completely the same as each other.

In an exemplary embodiment of the disclosure, in the touch sensing electrode, at least one side of each of at least several grids of the grid-like sub-electrodes is formed by sequentially connecting in series a plurality of first strip electrodes and a plurality of second strip electrodes alternately arranged and disposed in different layers; in the touch drive electrode, at least one side of each of at least several grids of the grid-like sub-electrodes is formed by sequentially connecting in series a plurality of third strip electrodes and a plurality of fourth strip electrodes alternately arranged and disposed in different layers; and the first strip electrodes are arranged in the same layer as the third strip electrodes, and the second strip electrodes are arranged in the same layer as the fourth strip electrodes.

In an exemplary embodiment of the disclosure, the touch sensing electrodes are arranged in a different layer from the touch drive electrodes, and an insulation layer is disposed between the touch sensing electrode and the touch drive electrode; an orthogonal projection of each touch sensing electrode on the substrate is formed by a plurality of line segments sequentially connected with each other and extending in directions which are not completely the same as each other, and an orthogonal projection of each touch drive electrode on the substrate is formed by a plurality of line segments sequentially connected with each other and extending in directions which are not completely the same as each other.

In an exemplary embodiment of the disclosure, each touch sensing electrode is formed by sequentially connecting in series a plurality of first sub-electrodes and a plurality of second sub-electrodes alternatively arranged and disposed in different layers; and/or each touch drive electrode is formed by sequentially connecting in series a plurality of third sub-electrodes and a plurality of fourth sub-electrodes alternatively arranged and disposed in different layers.

In an exemplary embodiment of the disclosure, the touch chip is configured to determine the bending state of the capacitive touch screen based on a capacitance value change trend of the part of the touch sensing electrodes, of which the capacitance values have been changed.

In an exemplary embodiment of the disclosure, the touch sensing electrodes are disposed in the same layer as the touch drive electrodes, and the touch chip is configured to: determine the capacitive touch screen is bent toward a side of the substrate facing the touch sensing electrodes when the capacitance values of the part of the touch sensing electrodes are increased; and determine the capacitive touch screen is bent toward a side of the substrate facing away from the touch sensing electrodes when the part of the capacitance values of the touch sensing electrodes are decreased.

In an exemplary embodiment of the disclosure, the touch sensing electrodes are disposed in a different layer from the touch drive electrodes and are located between the touch drive electrodes and the substrate, and the touch chip is configured to: determine the capacitive touch screen is bent toward a side of the substrate facing the touch sensing electrodes when the capacitance values of the part of the touch sensing electrodes are increased; and determine the capacitive touch screen is bent toward a side of the substrate facing away from the touch sensing electrodes when the capacitance values of the part of the touch sensing electrodes are decreased.

In an exemplary embodiment of the disclosure, the touch drive electrodes are disposed in a different layer from the touch sensing electrodes and are located between the touch sensing electrodes and the substrate, and the touch chip is configured to: determine the capacitive touch screen is bent toward a side of the substrate facing the touch sensing electrodes when the capacitance values of the part of the touch sensing electrodes are decreased; and determine the capacitive touch screen is bent toward a side of the substrate facing away from the touch sensing electrodes when the capacitance values of the part of the touch sensing electrodes are increased.

In an exemplary embodiment of the disclosure, the touch chip is further configured to, when the capacitance values of another part of the touch sensing electrodes, the number of which is less than the preset number, are changed, determine a touch position on the touch screen based on changes in capacitance value of the another part of the touch sensing electrodes.

In another aspect of the disclosure, an embodiment of the disclosure further provides a display device comprising the capacitive touch screen described in any one of embodiments of the disclosure.

In a further another aspect of the disclosure, an embodiment provides a bending judgment method for the capacitive touch screen described in any one of embodiments of the disclosure, comprising: applying a driving single to touch drive electrodes; detecting a capacitance value of each touch sensing electrode; and determining, when the capacitance values of a part of the touch sensing electrodes, which are adjacent to each other and the number of which is equal to or greater than the preset number, are changed, and a difference in capacitance value of the part of the touch sensing electrodes, of which the capacitance values have been changed, is less than the predetermined value, a bending state of the capacitive touch screen based on capacitance value change information of the part of the touch sensing electrodes.

In an exemplary embodiment of the disclosure, in the method as described above, determining a bending state of the capacitive touch screen based on capacitance value change information of the part of the touch sensing electrodes comprises: determining the bending state of the capacitive touch screen based on a capacitance value change trend of the part of the touch sensing electrodes, the capacitance values of which have been changed.

In an exemplary embodiment of the disclosure, the above method further comprises determining, when the capacitance values of another part of the touch sensing electrodes, the number of which is less than the preset number, are changed, a touch position on the touch screen based on changes in capacitance value of the another part of the touch sensing electrodes.

DETAILED DESCRIPTION OF PREFERRED EMBODIMENTS

In order to make the objects, technical solutions and advantageous more clear, the disclosure will be described in further detail with reference to the accompanying drawings. Obviously, the described embodiments are merely a part of embodiments of the disclosure, rather than being all embodiments thereof. Based on the embodiments of the disclosure, all other embodiments arrived at by those ordinary skilled in the art without any inventive step will fall within the scope of the disclosure.

The shapes and sizes of parts in the accompanying drawings will not reflect the true scales thereof, rather are only intended to illustrate the disclosure.

Figure 1:
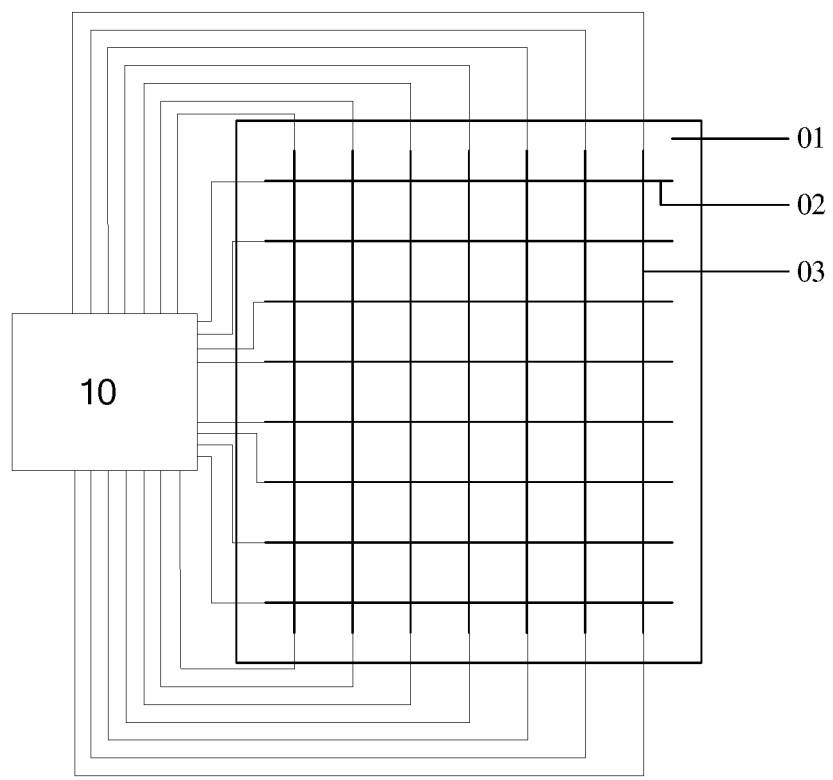
FIG. 1 is a schematic structural view of a capacitive touch screen according to an exemplary embodiment of the disclosure.

As shown in FIG. 1, a capacitive touch screen according to an embodiment of the disclosure comprises a substrate 01, a plurality of touch sensing electrodes 02 and a plurality of touch drive electrodes 03 located on the substrate 01, and a touch chip 10 electrically connected with the touch sensing electrodes 02 and the touch drive electrodes 03 respectively. In some embodiments, the touch drive electrodes may be disposed to be insulated from and intersect with the touch sensing electrodes. In other embodiments, it is possible to arrange the touch drive electrodes and the touch sensing electrodes in other manners such that a coupling capacitance may be generated between the touch drive electrode and the touch sensing electrode.

The touch chip 10 is configured to apply a driving signal to the touch drive electrodes 03 and detect a capacitance value of each touch sensing electrode 02, and configured to, when the capacitance values of a part of the touch sensing electrodes 02, which are located adjacent to each other and the number of which is equal to or greater than a preset number, are changed, and a difference in capacitance value of the part of the touch sensing electrodes 02, of which the capacitance values have been changed, is less than a predetermined value, determine a bending state of the capacitive touch screen based on capacitance value change information (information associated with changes in capacitance value) of the part of the touch sensing electrodes 02, of which the capacitance values have been changed.

In the capacitive touch screen according to the embodiments of the disclosure, when the touch screen is bent, the coupling capacitance value generated between most of the touch sensing electrodes and the touch drive electrodes will be changed greatly, compared to the touch screen being not bent. Thus, through applying the drive single to the touch drive electrodes and detecting the capacitance value of each touch sensing electrode, it is possible to, when the capacitance values of a part of touch sensing electrodes, which are adjacent to each other and the number of which is equal to or greater than the preset number, are changed, and a difference in capacitance value of the part of the touch sensing electrodes, of which the capacitance values have been changed, is less than the predetermined value, determine the bending state of the capacitive touch screen based on the capacitance value change information of the part of the touch sensing electrode, of which the capacitance values have been changed. Thus, the capacitive touch screen according to embodiments of the disclosure can determine the bending state of the screen without additionally adding any sensing element. Thus, the cost of the product will be reduced and the reliability of the product will not be affected.

In an exemplary embodiment of the disclosure, the touch chip is configured to determine the bending state of the capacitive touch screen based on the capacitance value change information of the part of the touch sensing electrodes, of which the capacitance values have been changed. For example, the touch chip is configured to determine the bending state of the capacitive touch screen based on a capacitance value change trend of the part of the touch sensing electrodes, of which the capacitance values have been changed.

In an exemplary embodiment of the disclosure, the touch chip is further configured to, when the capacitance values of another part of the touch sensing electrodes, the number of which is less than the preset number, are changed, determine a touch position based on changes in capacitance value of the another part of the touch sensing electrodes. The principle of determining the touch position of the touch sensitive screen of the disclosure is same as that in the prior arts, and the description thereof is omitted herein.

Note that, with the capacitive touch screen according to embodiments of the disclosure, the a bending state in which the capacitive touch screen is bent with the touch drive electrode as a bending axis can be determined or identified. Further, the above capacitive touch screen is suitable for a single-point touch operation.

In the capacitive touch panel according to embodiments of the disclosure, when the capacitive touch screen is bent with the touch drive electrode as the bending axis, the capacitance values of all the touch sensing electrodes will be substantially changed, and amounts of the capacitance value change of the touch sensing electrodes are relatively similar to each other. However, when the capacitive touch screen is touched, generally, only the capacitance values of the touch sensing electrodes corresponding to the touching position will be changed. For example, when an effective touch action occurs, only the capacitance values of less touch sensing electrodes are changed. When an invalid touch action occurs, for example, when the touch screen is touched by the whole hand, the capacitance values of more touch sensing electrodes are changed. However, since the hand surface is uneven, the changes in capacitance value of the touch sensing electrodes, of which the capacitance values have been changed, are non-uniform. Therefore, with the capacitive touch screen provided according to embodiments of the present disclosure, it can determine whether or not the capacitance value change is caused by the touch operation or by bending of the touch screen by determining the number of touch sensing electrodes, the capacitance values of which have been changed, and the amounts of the changes in capacitance value thereof.

Illustratively, when the touch screen is touched by a finger, one finger will generally overlap at least one touch sensing electrode. Thus, in the capacitive touch screen according to embodiments of the disclosure, the preset number is set greater than the number of the touch sensing electrodes overlapping one finger. For example, the preset number may be half of the total number of the touch sensing electrodes in the capacitive touch screen.

Further, in some exemplary embodiments, the preset number may be determined based on empirical values. For example, it is possible to perform several detections on the capacitance values of the part of the touch sensing electrodes, of which the capacitance values have been changed, so as to obtain a first range of the capacitance value difference therebetween when the capacitive touch screen is bent, and to perform several detections on the capacitance values of the part of the touch sensing electrodes, of which the capacitance values have been changed, so as to obtain a second range of the capacitance value difference therebetween when the invalid touch occurs, and then to determine a reasonable preset number based on the first and second ranges.

Figure 2:
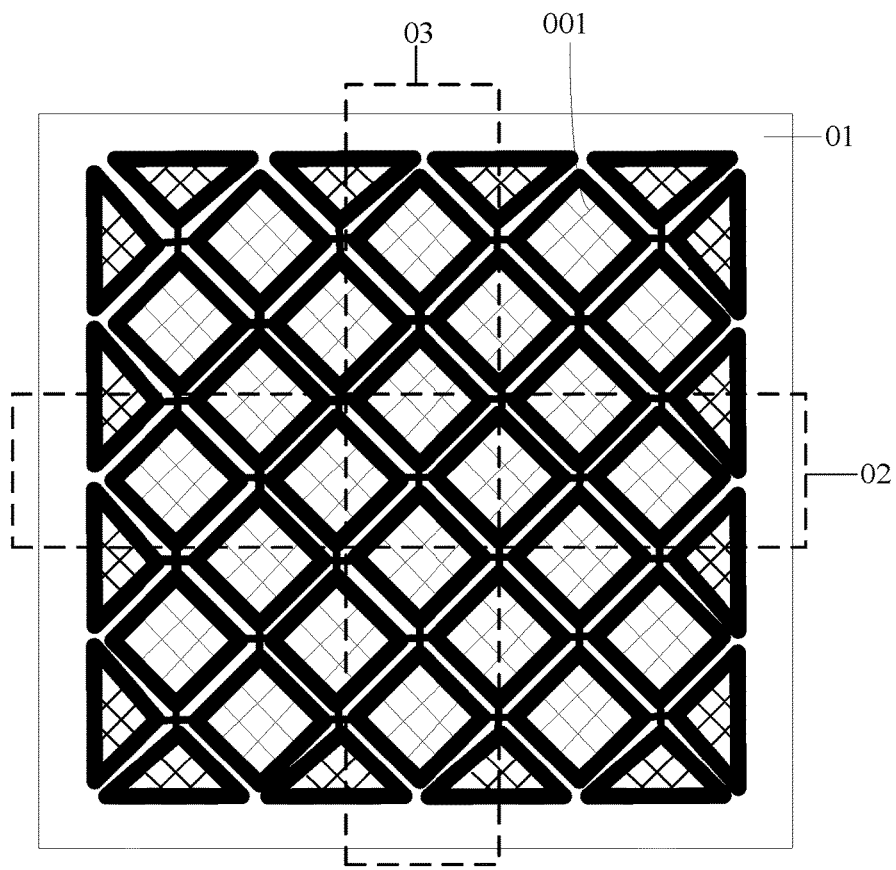
FIG. 2 is a plan view schematically showing a structure of a capacitive touch screen according to an embodiment of the disclosure.

In one embodiment of the disclosure, as shown in FIG. 2, the touch sensing electrodes 02 are arranged in the same layer as the touch drive electrodes 03. Further, the touch sensing electrode 02 is composed of a plurality of grid-like sub-electrodes 001 arranged in one of a row direction and a column direction, and the touch drive electrode 03 is composed of a plurality of grid-like sub-electrodes 001 arranged in the other of the row direction and the column direction.

Illustratively, in the capacitive touch screen according to the embodiments of the disclosure, expression "arranged in the same layer" may refer to: each of the touch sensing electrode and the touch drive electrode is arranged in a single layer, and the single layer of the touch sensing electrodes is arranged in the same layer as the single layer of the touch drive electrodes; or at least one of the touch sensing electrodes and the touch drive electrodes are arranged in two sub-layers, the touch sensing electrodes and the touch drive electrodes are considered as being arranged in the same layer as long as one sub-layer of the touch sensing electrodes is arranged in the same layer as one sub-layer of the touch drive electrodes, and the present disclosure is not limited to those.

Figure 3:
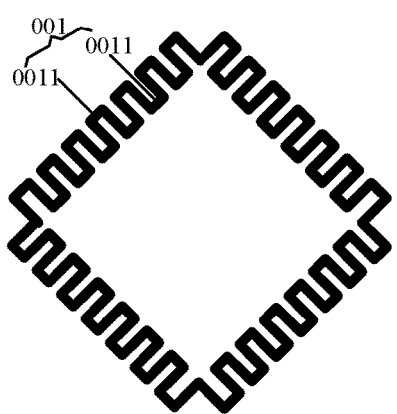
FIG. 3 is a plan view schematically showing a structure one of grids of grid-like sub-electrodes of the capacitive touch screen shown in FIG. 2.

In one embodiment, in order to determine the bending state of the capacitive touch screen better, i.e., to increase degree of capacitance value change when the touch screen is bent, as shown in FIG. 3, at least one side of each of at least several (for example, one, two or more) grids of the grid-like sub-electrodes 001 of the touch sensing electrodes and the touch drive electrodes is formed by sequentially connecting in series a plurality of conductive strips 0011 extending in directions which are not completely same as each other. FIG. 3 only shows a structural plan view of one grid.

Figure 4:
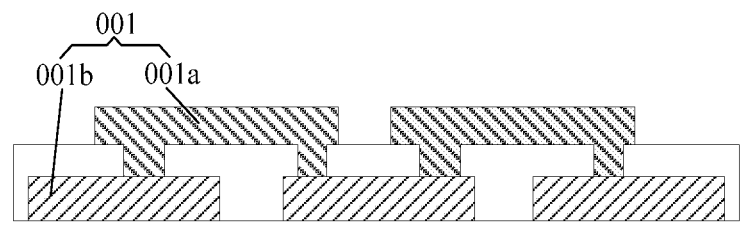
FIG. 4 is a schematic cross-sectional view showing one of the grids of grid-like sub-electrodes of the capacitive touch screen shown in FIG. 2 taken along a side of the grid.

In other embodiments, as shown in FIG. 4, at least one side of each of at least several (for example, one, two or more) grids of the grid-like sub-electrodes 001 of the touch sensing electrodes is formed by sequentially connecting in series a plurality of first strip electrodes 001a and a plurality of second strip electrodes 001b alternately arranged and disposed in different layers, in order to determine the bending state of the capacitive touch screen better, i.e., to increase degree of capacitance value change when the touch screen is bent. FIG. 4 only shows a structural cross-sectional view of the grid taken along one side thereof. Likewise, in some embodiments, at least one side of each of at least several (for example, one, two or more) grids of the grid-like sub-electrodes 001 of the touch drive electrodes is formed by sequentially connecting in series a plurality of third strip electrodes and a plurality of fourth strip electrodes alternately arranged and disposed in different layers. The first strip electrodes may be arranged in the same layer as the third strip electrodes, and the second strip electrodes may be arranged in the same layer as the fourth strip electrodes. In other words, the touch sensing electrodes and the touch drive electrodes may be arranged in the same layer, as described above.

In an exemplary embodiment of the disclosure, each of the touch sensing electrodes and the touch drive electrodes is made of a metal material, and the present disclosure is not limited to this.

In an exemplary embodiment, the touch sensing electrodes are arranged in the same layer as the touch drive electrodes, and the touch chip is configured to determine the bending state of the capacitive touch screen based on a capacitance value change trend of the touch sensing electrodes. For example, when the capacitance values of the part of the touch sensing electrodes are increased, the touch chip may determine that the capacitive touch screen is bent toward a side of the substrate facing the touch sensing electrodes; when the capacitance values of the part of the touch sensing electrodes are decreased, the touch chip may determine that the capacitive touch screen is bent toward a side of the substrate facing away from the touch sensing electrodes.

The above-described embodiments are illustrated by taking the touch sensing electrodes and the touch drive electrodes having grid-like structures and arranged in the same layer as an example, the disclosure, however, is not intended to be limited thereto. The following description will be set forth by taking the touch sensing electrodes being arranged in a different layer from the touch drive electrodes as an example.

Figure 5:
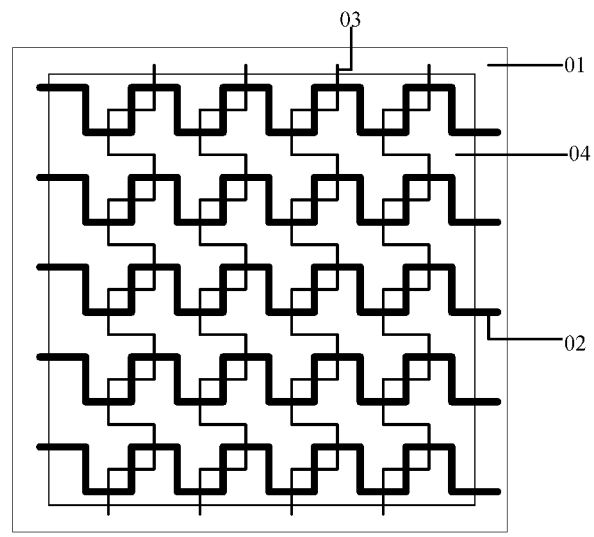
FIG. 5 is a plan view schematically showing a capacitive touch screen according to another embodiment of the disclosure.

In an exemplary embodiment of the disclosure, as shown in FIG. 5, the touch sensing electrodes 02 are arranged in a different layer from the touch drive electrodes 03, and an insulation layer 04 is disposed between the touch sensing electrode 02 and the touch drive electrode 03.

In one embodiment, in order to determine the bending state of the capacitive touch screen better, i.e., to increase degree of change in capacitance value when the touch screen is bent, as shown in FIG. 5, an orthogonal projection of each touch sensing electrode 02 on the substrate 01 is formed by a plurality of line segments sequentially connected with each other and extending in directions which are not completely the same as each other, and an orthogonal projection of each touch drive electrode 03 on the substrate 01 is formed by a plurality of line segments sequentially connected with each other and extending in directions which are not completely the same as each other.

Figure 6A:
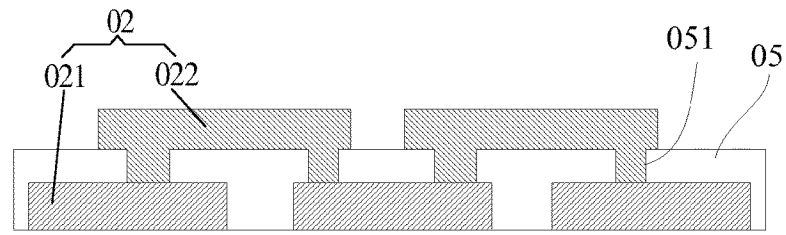
FIG. 6A is a schematic cross-sectional view showing a structure of a touch sensing electrode of a capacitive touch screen according to an embodiment of the disclosure.

In other embodiments, in order to determine the bending state of the capacitive touch screen better, i.e., to increase degree of change in the capacitance value when the touch screen is bent, as shown in FIG. 6A, each touch sensing electrode 02 may be formed by a plurality of first sub-electrodes 021 and a plurality of second sub-electrodes 022 sequentially connected in series and alternatively arranged in different layers.

When the first sub-electrodes 021 are arranged in a different layer from the second sub-electrodes 022, as shown in FIG. 6A, an insulation layer 05 is disposed between the first sub-electrodes 021 and the second sub-electrodes 022, and the first sub-electrodes 021 and the second sub-electrodes 022 are electrically connected with each other by via holes 051 formed in and passing through the insulation layer 05.

Figure 6B:
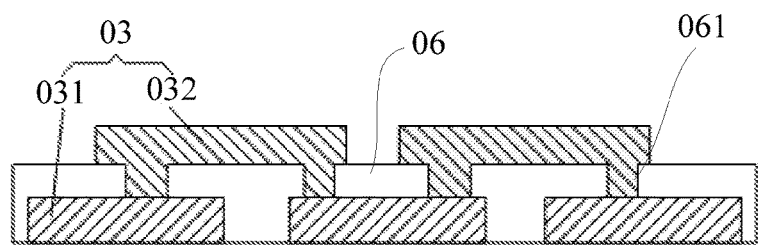
FIG. 6B is a schematic cross-sectional view showing a structure of a touch drive electrode of a capacitive touch screen according to an embodiment of the disclosure.

Furthermore, in order to determine the bending state of the capacitive touch screen better, in the capacitive touch screen according to the embodiments of the disclosure, as shown in FIG. 6B, each touch drive electrode 03 may be formed by sequentially connecting in series a plurality of third sub-electrodes 031 and a plurality of fourth sub-electrode 032 alternatively arranged and disposed in different layers.

In one embodiment, when the third sub-electrodes 031 are arranged in a different layer from the fourth sub-electrodes 032, an insulation layer 06 is disposed between the third sub-electrodes 031 and the fourth sub-electrodes 032, and the third sub-electrodes 031 and the fourth sub-electrodes 032 are electrically connected with each other by via holes 061 formed in and passing through the insulation layer 06, as shown in FIG. 6B.

In an exemplary embodiment, the touch sensing electrodes are arranged in a different layer from the touch drive electrodes, and the touch chip is configured to determine the bending state of the capacitive touch screen based on the a capacitance value change trend of the touch sensing electrodes. For example, in a case where the touch sensing electrodes are located between the touch drive electrodes and the substrate, when the capacitance values of the part of the touch sensing electrodes are increased, the touch chip may determine that the capacitive touch screen is bent toward the side of the substrate facing the touch sensing electrodes; and when the capacitance values of the part of the touch sensing electrodes are decreased, the touch chip may determine that the capacitive touch screen is bent toward the side of the substrate facing away from the touch sensing electrodes. In a case where the touch drive electrodes are located between the touch sensing electrodes and the substrate, when the capacitance values of the part of the touch sensing electrodes are decreased, the touch chip may determine that the capacitive touch screen is bent toward the side of the substrate facing the touch sensing electrodes; and when the capacitance values of the part of the touch sensing electrodes are increased, the touch chip may determine that the capacitive touch screen is bent toward the side of the substrate facing away from the touch sensing electrodes.

Further, in an exemplary embodiment of the disclosure, the substrate may be a flexible substrate, but the present disclosure is not limited thereto.

Figure 7:
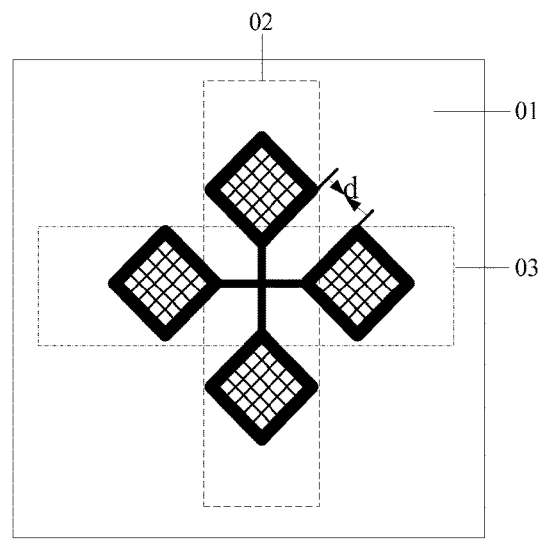
FIG. 7 is schematic plan view showing an arrangement of touch sensing electrodes and touch drive electrodes of a capacitive touch screen according to an embodiment of the disclosure.
Figure 8A:
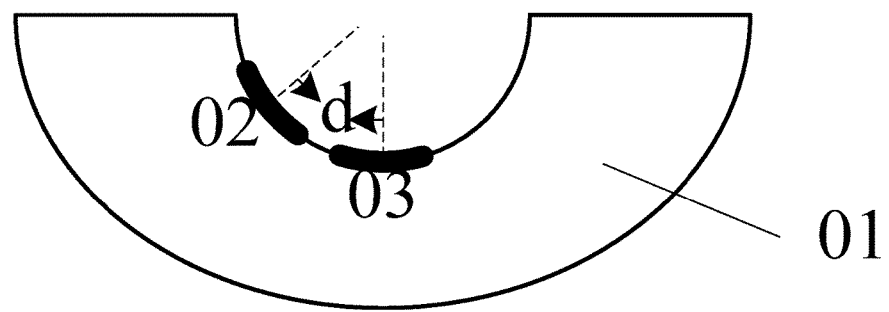
FIGS. 8a and 8b are schematic view showing states in which a distance between the touch sensing electrode and the touch drive electrode of the capacitive touch screen shown in FIG. 7 is changed as a bending state of the touch screen is changed, respectively.
Figure 8B:
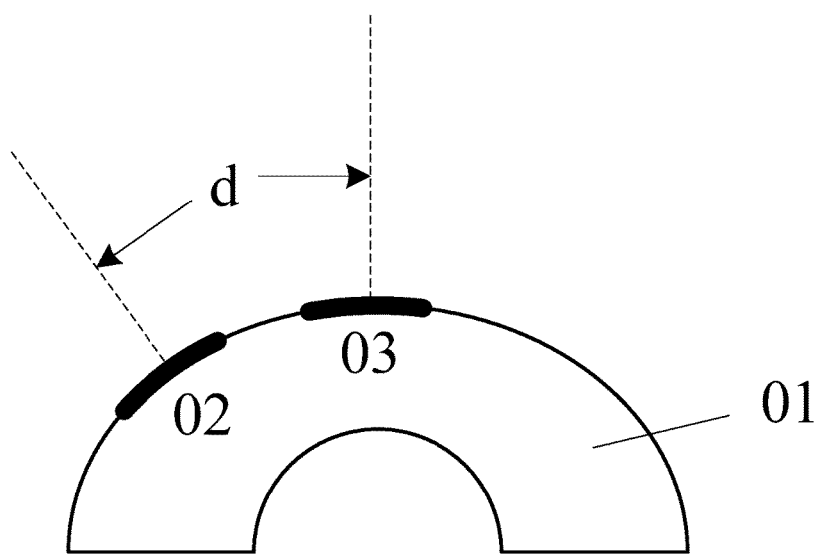

Illustratively, in the capacitive touch screen according to the embodiments of the disclosure, as shown in FIG. 7, the touch sensing electrodes 02 and the touch drive electrodes 03 have grid-like orthographic projections on the substrate 01, the touch sensing electrodes 02 are arranged in the same layer as the touch drive electrodes 03, and a distance d is formed between the touch sensing electrode 02 and the touch drive electrode 03. As shown in FIGS. 8a and 8b, when the capacitive touch screen is bent, the distance d between the touch sensing electrode 02 and the touch drive electrode 03 will vary. For example, as shown in FIG. 8a, when the capacitive touch screen is bent toward the side of the substrate 01 facing the touch sensing electrodes 02, the distance d between the touch sensing electrode 02 and the touch drive electrode 03 is decreased, and the coupling capacitance value therebetween is increased. For example, as shown in FIG. 8b, when the capacitive touch screen is bent toward the side of the substrate 01 facing away from the touch sensing electrodes 02, the distance d between the touch sensing electrode 02 and the touch drive electrode 03 is increased, and the coupling capacitance value therebetween is decreased. Therefore, through detecting the capacitance values of the touch sensing electrode, it is possible to determine the bending state of the capacitive touch screen based on the capacitance value change trend of the part of the touch sensing electrodes, which are adjacent to each other and the number of which is equal to or greater than the preset number, are changed, and a difference in capacitance value of the part of the touch sensing electrodes, of which the capacitance values have been changed, is less than the predetermined value. When the capacitance values of the part of the touch sensing electrodes are increased, it is determined that the capacitive touch screen is bent toward the side of the substrate facing the touch sensing electrodes. When the capacitance values of the part of the touch sensing electrodes are decreased, it is determined that the capacitive touch screen is bent toward the side of the substrate facing away from the touch sensing electrodes.

Figure 9:
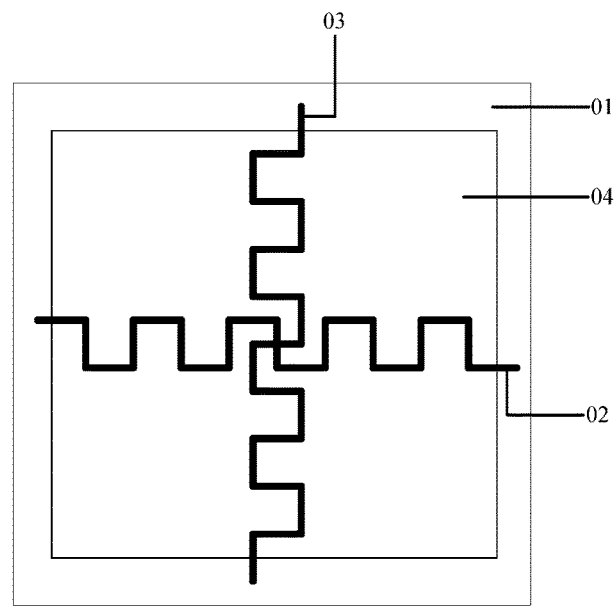
FIG. 9 is a schematic plan view showing an arrangement of one touch sensing electrode and one touch drive electrode of a capacitive touch screen according to a further embodiment of the disclosure.
Figure 10A:
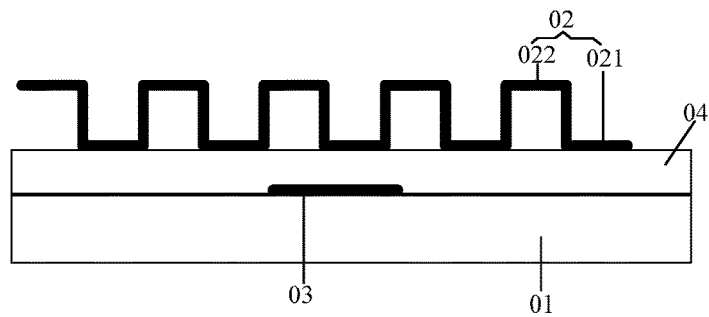
FIG. 10A is a schematic cross-sectional view showing a structure of one touch sensing electrode and one touch drive electrode of a capacitive touch screen according to an embodiment of the disclosure.
Figure 10B:
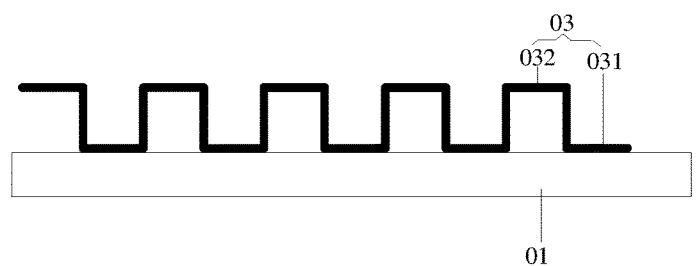
FIG. 10B is a schematic cross-sectional view showing a structure of a touch drive electrode of a capacitive touch screen according to an embodiment of the disclosure.
Figure 11A:
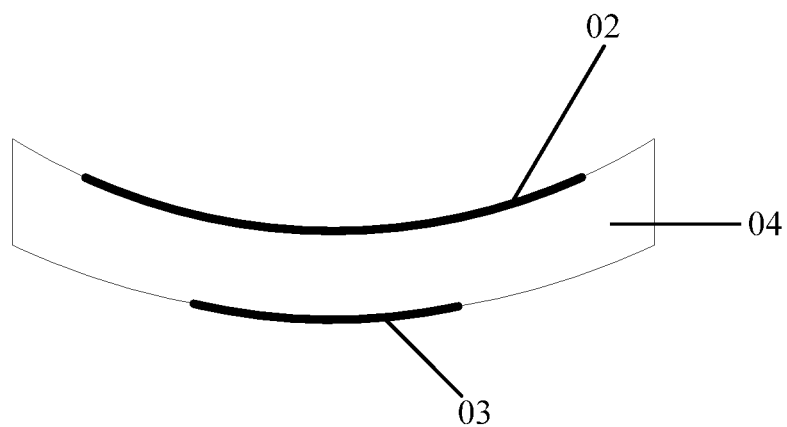
FIGS. 11a and 11b are schematic views shown states of the capacitive touch screens shown in FIGS. 9 and 10 when being bent, respectively.
Figure 11B:
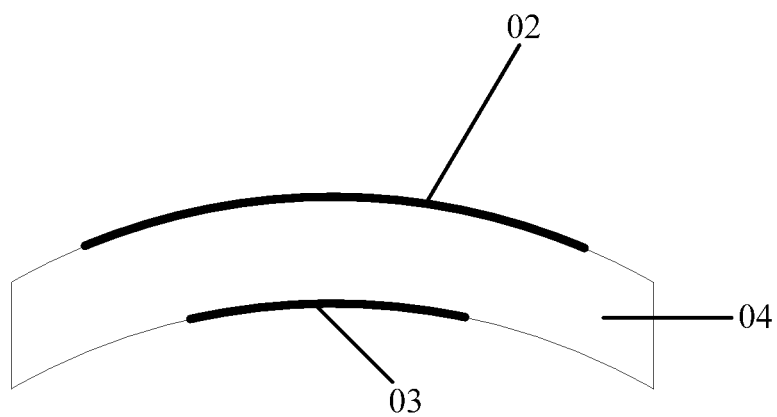

In other embodiments of the disclosure, as shown in FIGS. 9 and 10, the touch drive electrodes 03 are located between the touch sensing electrodes 02 and the substrate 01, and the insulation layer 04 is disposed between the touch sensing electrode 02 and the touch drive electrode 03. an orthogonal projection of each of the touch sensing electrode 02 and touch drive electrode 03 on the substrate 01 is formed by a plurality of line segments sequentially connected with each other and extending in directions which are not completely the same as each other as shown in FIG. 9; or, the touch sensing electrode 02 is composed of the first sub-electrodes 021 and the second sub-electrodes 022 arranged in different layers and the touch drive electrode 03 is composed of the third sub-electrodes 031 and the fourth sub-electrodes 032 arranged in different layers as shown in FIGS. 10A and 10B. When the touch screen is in the bending state shown in FIG. 11a, the touch sensing electrode 02 is compressed, this causes a facing area between the touch sensing electrode 02 and the touch drive electrode 03 to be decreased, thereby resulting in the decreased coupling capacitance value therebetween; and when the touch screen in the bending state shown in FIG. 11b, the touch sensing electrode 02 is stretched, this causes the facing area between the touch sensing electrode 02 and the touch drive electrode 03 to be increased, thereby resulting in the increased coupling capacitance value therebetween. Therefore, the capacitance values of the touch sensing electrodes are detected, such that when the capacitance values of a part of the touch sensing electrodes, which are adjacent to each other and the number of which is equal to or greater than a preset number, are changed, and a difference in capacitance value of the part of the touch sensing electrodes, of which the capacitance values have been changed, is less than a predetermined value, it is possible to determine the bending state of the capacitive touch screen based on the capacitance value change trend of the part of the touch sensing electrodes. When the capacitance values of the touch sensing electrodes are decreased, it is determined that the capacitive touch screen is bent toward the side of the substrate facing the touch sensing electrodes. When the capacitance values of the part of the touch sensing electrodes are increased, it is determined that the capacitive touch screen is bent toward the side of the substrate facing away from the touch sensing electrodes.

In an alternative embodiment of the disclosure, in the case where the touch sensing electrodes are located between the touch drive electrodes and the substrate, when the capacitance values of the part of the touch sensing electrodes are increased, it is determined that the capacitive touch screen is bent toward the side of the substrate facing the touch sensing electrodes; and when the capacitance values of the part of the touch sensing electrodes are decreased, it is determined that the capacitive touch screen is bent toward the side of the substrate facing away from the touch sensing electrodes. The specific principle is same as that of the above embodiments and the detailed description thereof is omitted herein.

In the capacitive touch screen according to the embodiments of the disclosure, the bending state of the touch screen can be determined based on the capacitance value change trend of the touch sensing electrodes, so that a command input operation can be realized by bending the touch screen without additionally adding any other sensing element. For example, it is possible to control an image displayed on the touch screen to zoom in or out by bending the touch screen, or to control a volume of the touch screen to be increased or decreased, and the present disclosure is not limited to those.

Figure 12:
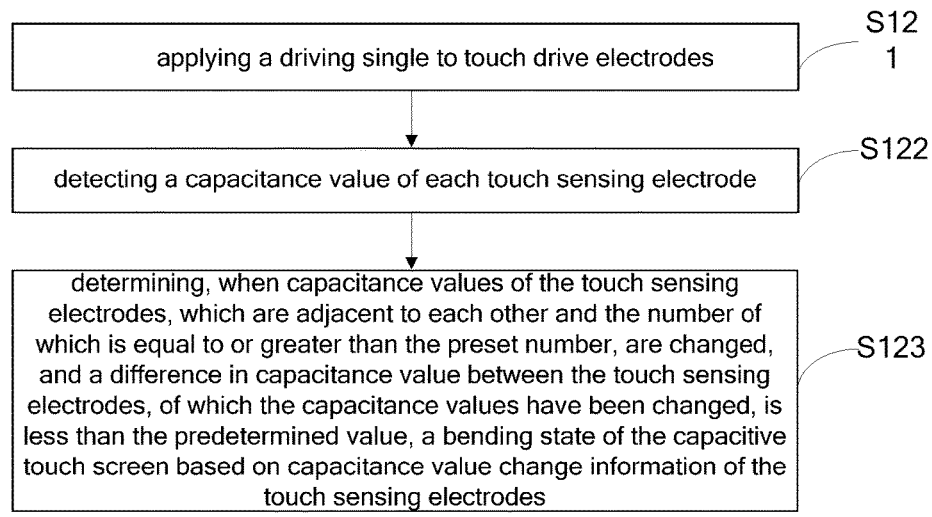
FIG. 12 is a flowchart of a bending judgment method for a capacitive touch screen according to an embodiment of the disclosure.

Based on the same inventive concept, an embodiment of the disclosure further provides a bending judgment method for a capacitive touch screen, as shown in FIG. 12, comprising following steps:

S121: applying a driving single to the touch drive electrodes;

S122: detecting a capacitance value of each touch sensing electrode; and

S123: determining, when the capacitance values of a part of the touch sensing electrodes, which are adjacent to each other and the number of which is equal to or greater than a preset number, are changed, and a difference in capacitance value of the part of the touch sensing electrodes, of which the capacitance values have been changed, is less than a predetermined value, a bending state of the capacitive touch screen based on capacitance value change information of the part of the touch sensing electrodes.

In an exemplary embodiment of the disclosure, determining a bending state of the capacitive touch screen based on capacitance value change information of the part of the touch sensing electrodes comprises determining the bending state of the capacitive touch screen based on a capacitance value change trend of the part of the touch sensing electrodes, the capacitance values of which have been changed.

In the bending judgment method for a capacitive touch screen according to the embodiments of the disclosure, when the touch screen is bent, the coupling capacitance value generated between most of the touch sensing electrodes and the touch drive electrodes will be changed greatly, compared the touch screen being not bent. Thus, the drive signal is applied to each touch drive electrode and the capacitance values of the touch sensing electrodes are detected, such that when the capacitance values of a part of the touch sensing electrodes, which are adjacent to each other and the number of which is equal to or greater than the preset number, are changed, and differences in capacitance value of the part of the touch sensing electrodes, of which the capacitance values have been changed, is less than the predetermined value, it is possible to determine the bending state of the capacitive touch screen based on the capacitance value change information of the part of the touch sensing electrode. Thus, with the above capacitive touch screen according to embodiments of the disclosure, the bending state of the screen can be determined without additionally adding any sensing element. Thus, the cost of the product will be reduced and the reliability of the product will not be affected.

Further, according to an embodiment of the disclosure, the bending judgment method may further comprise:

when the capacitance values of another part of the touch sensing electrode, the number of which is less than the preset number, are changed, determining a touch position based on changes in capacitance value of the another part of the touch sensing electrodes.

Based on the same inventive concept, an embodiment of the disclosure further provides a display device comprising the above capacitive value touch screen according to any embodiment of the disclosure. The display device may comprise a mobile phone, a tablet computer, a television, a display, a notebook computer, a digital photo frame, a navigator and any other products or components having a display function. The display device may be implemented in a similar way to the capacitive touch screen as described above, and the repeated description thereof is omitted herein.

In the above-described capacitive touch screen and the bending judgment method therefor and the display device according to the embodiments of the disclosure, when the touch screen is bent, the coupling capacitance value generated between most of the touch sensing electrodes and the touch drive electrodes will be changed greatly, compared the touch screen being not bent. Thus, the drive signal is applied to each touch drive electrode and the capacitance values of the touch sensing electrode are detected, such that when the capacitance values of a part of the touch sensing electrodes, which are located adjacent to each other and the number of which is equal to or greater than the preset number, are changed, and a difference in capacitance value between the part of the touch sensing electrodes, of which the capacitance values have been changed, is less than the predetermined value, it is possible to determine the bending state of the capacitive touch screen based on the capacitance value change information of the part of the touch sensing electrodes. Thus, with the above capacitive touch screen according to embodiments of the disclosure, the bending state of the screen can be determined through the capacitance value change trend obtained by comparing the capacitance values of the touch sensing electrodes to predetermined capacitance values, without additionally adding any sensing element. Thus, the cost of the product will be reduced and the reliability of the product will not be affected.

Obviously, those skilled in the art may make various changes and modifications without departing from the spirit and scope of the disclosure. In this way, if these changes and modifications of the disclosure fall within the scope claimed in claims and their equivalents, the disclosure is also intended to include these changes and modifications.

What is claimed is:

1. A capacitive touch screen, comprising:
   a substrate;
   a plurality of touch sensing electrodes and a plurality of touch drive electrodes located on the substrate; and
   a touch chip electrically connected with the touch sensing electrodes and the touch drive electrodes respectively,
   wherein the touch chip is configured to apply a driving signal to the touch drive electrodes and detect a capacitance value of each of the touch sensing electrodes, and is further configured to, when the capacitance values of a first part of the touch sensing electrodes, which are adjacent to each other and the number of which is equal to or greater than a preset number, are changed, and a difference in capacitance value of the first part of the touch sensing electrodes, of which the capacitance values have been changed, is less than a predetermined value, determine a bending state of the capacitive touch screen based on capacitance value change information of the first part of the touch sensing electrodes, of which the capacitance values have been changed.

2. The capacitive touch screen according to claim 1, wherein
   the touch sensing electrodes are disposed in the same layer as the touch drive electrodes; and
   each touch sensing electrode is composed of a plurality of grid-like sub-electrodes arranged in a one of a row direction and a column direction, and each touch drive electrode is composed of a plurality of grid-like sub-electrodes arranged in the other of the row direction and the column direction.

3. The capacitive touch screen according to claim 2, wherein at least one side of each of at least several grids of the grid-like sub-electrode is composed of a plurality of conductive strips extending in directions which are not completely the same as each other.

4. The capacitive touch screen according to claim 2, wherein:
   in the touch sensing electrode, at least one side of each of at least several grids of the grid-like sub-electrodes is formed by sequentially connecting in series a plurality of first strip electrodes and a plurality of second strip electrodes alternately arranged and disposed in different layers;
   in the touch drive electrode, at least one side of each of at least several grids of the grid-like sub-electrodes is formed by sequentially connecting in series a plurality of third strip electrodes and a plurality of fourth strip electrodes alternately arranged and disposed in different layers; and
   the first strip electrodes are arranged in the same layer as the third strip electrodes, and the second strip electrodes are arranged in the same layer as the fourth strip electrodes.

5. The capacitive touch screen according to claim 1, wherein:

the touch sensing electrodes are arranged in a different layer from the touch drive electrodes, and an insulation layer is disposed between the touch sensing electrodes and the touch drive electrodes; and an orthogonal projection of each touch sensing electrode on the substrate is formed by a plurality of first line segments sequentially connected with each other and extending in directions which are not completely the same as each other, and an orthogonal projection of each touch drive electrode on the substrate is formed by a plurality of second line segments sequentially connected with each other and extending in directions which are not completely the same as each other.

6. The capacitive touch screen according to claim 5, wherein each touch sensing electrode is formed by sequentially connecting in series a plurality of first sub-electrodes and a plurality of second sub-electrodes alternatively arranged and disposed in different layers; and/or each touch drive electrode is formed by sequentially connecting in series a plurality of third sub-electrodes and a plurality of fourth sub-electrodes alternatively arranged and disposed in different layers.

7. The capacitive touch screen according to claim 1, wherein the touch chip is configured to determine the bending state of the capacitive touch screen based on a capacitance value change trend of the first part of the touch sensing electrodes, of which the capacitance values have been changed.

8. The capacitive touch screen according to claim 7, wherein the touch sensing electrodes are disposed in the same layer as the touch drive electrodes, and the touch chip is configured to:

determine the capacitive touch screen is bent toward a side of the substrate facing the touch sensing electrodes when the capacitance values of the first part of the touch sensing electrodes are increased; and determine the capacitive touch screen is bent toward a side of the substrate facing away from the touch sensing electrodes when the capacitance values of the first part of the touch sensing electrodes are decreased.

9. The capacitive touch screen according to claim 8, wherein the touch chip is further configured to, when the capacitance values of a second part of the touch sensing electrodes, the number of which is less than the preset number, are changed, determine a touch position on the touch screen based on changes in capacitance value of the second part of the touch sensing electrodes.

10. The capacitive touch screen according to claim 7, wherein the touch sensing electrodes are disposed in a different layer from the touch drive electrodes and are located between the touch drive electrodes and the substrate, and the touch chip is configured to:

determine the capacitive touch screen is bent toward a side of the substrate facing the touch sensing electrodes when the capacitance values of the first part of the touch sensing electrodes are increased; and determine the capacitive touch screen is bent toward a side of the substrate facing away from the touch sensing electrodes when the capacitance values of the first part of the touch sensing electrodes are decreased.

11. The capacitive touch screen according to claim 10, wherein the touch chip is further configured to, when the capacitance values of a second part of the touch sensing electrodes, the number of which is less than the preset number, are changed, determine a touch position on the touch screen based on changes in capacitance value of the second part of the touch sensing electrodes.

12. The capacitive touch screen according to claim 7, wherein the touch drive electrodes are disposed in a different layer from the touch sensing electrodes and are located between the touch sensing electrodes and the substrate, and the touch chip is configured to:

determine the capacitive touch screen is bent toward a side of the substrate facing the touch sensing electrodes when the capacitance values of the first part of the touch sensing electrodes are decreased; and determine the capacitive touch screen is bent toward a side of the substrate facing away from the touch sensing electrodes when the capacitance values of the first part of the touch sensing electrodes are increased.

13. The capacitive touch screen according to claim 12, wherein the touch chip is further configured to, when the capacitance values of a second part of the touch sensing electrodes, the number of which is less than the preset number, are changed, determine a touch position on the touch screen based on changes in capacitance value of the second part of the touch sensing electrodes.

14. The capacitive touch screen according to claim 7, wherein the touch chip is further configured to, when the capacitance values of a second part of the touch sensing electrodes, the number of which is less than the preset number, are changed, determine a touch position on the touch screen based on changes in capacitance value of the second part of the touch sensing electrodes.

15. A display device, comprising the capacitive touch screen according to claim 7.

16. The capacitive touch screen according to claim 1, wherein the touch chip is further configured to, when the capacitance values of a second part of the touch sensing electrodes, the number of which is less than the preset number, are changed, determine a touch position on the touch screen based on changes in capacitance value of the second part of the touch sensing electrodes.

17. A display device, comprising the capacitive touch screen according to claim 1.

18. A bending judgment method for the capacitive touch screen according to claim 1, comprising:

applying a driving single to the touch drive electrodes;

detecting a capacitance value of each of the touch sensing electrodes; and determining, when the capacitance values of a first part of the touch sensing electrodes, which are adjacent to each other and the number of which is equal to or greater than the preset number, are changed, and a difference in capacitance value of the part of the touch sensing electrodes, of which the capacitance values have been changed, is less than the predetermined value, a bending state of the capacitive touch screen based on capacitance value change information of the part of the touch sensing electrodes.

19. The bending judgment method according to claim 18, wherein determining a bending state of the capacitive touch screen based on capacitance value change information of the part of the touch sensing electrodes comprises:

determining the bending state of the capacitive touch screen based on a capacitance value change trend of the first part of the touch sensing electrodes, the capacitance values of which have been changed.

20. The bending judgment method according to claim 18, further comprising:

determining, when the capacitance values of a second part of the touch sensing electrodes, the number of which is less than the preset number, are changed, a touch position on the touch screen based on changes in capacitance value of the second part of the touch sensing electrodes.

\* \* \* \* \*